United States Patent [19]

Briley

[11] 4,439,994
[45] Apr. 3, 1984

[54] THREE PHASE ABSORPTION SYSTEMS AND METHODS FOR REFRIGERATION AND HEAT PUMP CYCLES

[75] Inventor: Patrick B. Briley, Lawton, Okla.

[73] Assignee: Hybrid Energy Systems, Inc., Stillwater, Okla.

[21] Appl. No.: 395,357

[22] Filed: Jul. 6, 1982

[51] Int. Cl.³ .............................................. F25B 15/00
[52] U.S. Cl. ......................................... 62/101; 62/335; 62/476
[58] Field of Search ............... 62/476, 101, 335, 324.2

[56] References Cited

U.S. PATENT DOCUMENTS

| | | | |
|---|---|---|---|
| 3,483,710 | 12/1969 | Bearint | 62/101 X |
| 4,294,080 | 10/1981 | Cohen et al. | 62/101 X |
| 4,311,019 | 1/1982 | Rojey et al. | 62/101 |

*Primary Examiner*—Lloyd L. King
*Attorney, Agent, or Firm*—Chris H. Morgan

[57] ABSTRACT

A three phase absorption system containing two or more reactor systems for binding refrigerant in a thermally reversible chemical reaction to absorbent materials within the reactor systems, means for supplying heat to, and removing heat from the reactor systems, means for recovery of at least part of the sensible heat energy from reactors in each of the reactor systems, and means for conveying, expanding, evaporating and condensing refrigerant gas from the reactor systems. A method for providing continuous cooling and/or refrigeration which includes the steps of desorbing refrigerant in a gas phase from an absorbent in a first reactor using a low temperature heat source, transferring the desorbed refrigerant gas to a condensor, expanding the condensed refrigerant to a lower temperature and pressure liquid, evaporating the low temperature liquid with the heat from the cooling and/or refrigerant load, absorbing vapor from the evaporated refrigerant with an absorbent in a second reactor which is being cooled by a cooler, concurrently preparing two other absorption reactors for the same absorbing and desorbing steps by transferring heat between the two other reactors, and heating one and cooling the other of the two reactors at constant volume thereby pressurizing one and depressurizing the other of the two reactors, and cyclically repeating the steps by alternating the desorbing and absorbing steps between the four reactors. A method for providing continuous heating using a heat pump effect to recover heat energy at a low temperature and deliver heat energy to a heat sink at a higher temperature with such heating method comprising the same steps as used in the above cooling method but with the condensing and evaporating steps occurring at relatively lower temperature and with the condensor and cooler providing the heat energy to the heat sink and the evaporator recovering heat energy from a low temperature heat source to accomplish the heat pump effect.

34 Claims, 3 Drawing Figures

THREE PHASE ABSORPTION SYSTEMS AND METHODS FOR REFRIGERATION AND HEAT PUMP CYCLES

BACKGROUND OF THE INVENTION

1. Field of the Invention

This invention relates to continuous three phase absorption systems which utilize the heats of absorption as heat sources for heat pump systems and the heats of desorption to pressurize gaseous refrigerants for cooling and/or refrigeration systems.

2. Description of the Prior Art

Absorption systems using solid absorbents for heating and cooling have been designed to be driven by relatively low temperature heat sources. The two phase absorption system in U.S. Pat. Ser. No. 4,055,962 utilizes the heat of absorption and desorption for hydrogen gas and several exotic metals capable of chemically forming hydrides, $LaNi_4Cu$, $FeTi$, etc. This system uses a plurality of reactors to make an intermittent process into a continuous system. A three phase intermittent type of absorption system was recently disclosed in U.S. Pat. Ser. No. 4,205,531 which uses heats of vaporization and condensation for condensible bipolar gases and heats of formation for compounds formed from these gases when absorbed on porous sodium sulfide, $Na_2S$, and other chemically related solids.

A disadvantage of the hydride absorption system is the high cost of the exotic absorbent metals required. The three phase system as described in U.S. Pat. Ser. No. 4,205,531 is intermittent and therefore, if long term cooling and/or heating is to be achieved, either enormous quantities of absorbing solids must be provided for storage or a backup cooling and heating system is required while the absorption system is being recharged. However, both of these systems have high thermal efficiencies compared to conventional heating and cooling systems that use mechanical compressors.

BRIEF DESCRIPTION OF THE PRESENT INVENTION

This invention is a new continuous absorption system and method for cooling and/or refrigeration and heating using low temperature heat sources such as waste heat, wood, gas, coal, and solar. Heating and cooling are generated directly from the heats of desorption, absorption and evaporation in two or more absorption systems containing solid absorbent and the liquid and gas phases of a refrigerant which the solid absorbs. The method by which this invention heats and cools is different from purely gas phase absorption systems such as hydrogen-hydride absorption systems. This difference arises from the fact that the heat of vaporization of the refrigerant absorbed by the solid absorbent is utilized for cooling by passage of the refrigerant in a liquid phase through an expansion valve and vaporization of the expanded and cooled liquid in an evaporator. Such a phase change is not practical for hydride absorption systems. The result is that this invention requires fewer reactors, heat exchange coils, and valves than hydride absorption systems while still maintaining a continuous operation capability. Further, this invention requires considerably less expensive absorption materials such as $Na_2S$, $CaCl_2$, etc. Yet this invention retains many of the advantages of hydride systems such as the ability to operate over a large range of temperatures with high efficiencies, little or no mechanical input and with primarily thermochemical operation caused by relative pressure differences of refrigerant gas over absorbents and over liquid refrigerant. The thermally induced driving potential requires that the system contain absorbents in fluid communication but at two different temperatures.

Other advantages of this invention over gas phase absorption systems include higher heat energy extraction when used as a heat pump in the heating mode and two methods to keep the absorption system in operation when the temperature of the heat source that drives the system is reduced. This is particularly useful when the heat source is intermittent and has large variations in temperature such as a solar heat source. One method uses a blower to boost the pressure of desorbed gas from a reactor to the condensor pressure. The other method uses an expansion tank for storage of desorbed and condensed refrigerant and a pump for making up pressure losses when the refrigerant is circulated and evaporated in an evaporator.

The continuous absorption system of this invention comprises at least four absorption reactors containing one or more different types of chemical absorbants. Means for conveying, expanding and condensing refrigerant from the reactors, means for supplying heat to and removing heat from the reactors in out-of-phase, staggered cycles, and means for recovery of at least part of the sensible heat energy from the reactors.

The method of the invention includes the steps of thermally reversible absorption of a refrigerant with an absorbent in one or more absorption reactors, heating the saturated reactor absorbents at constant volume to achieve chemical compression of the refrigerant gas, reversible desorption of the saturated reactor absorbents, and cooling the reactor absorbents after desorption under constant volume to achieve chemical decompression and reconditioning of the reactor absorbents, and then cyclically repeating the above steps. At the same time as the above steps are proceeding at least one or more other absorption reactors is operating with the above steps in reverse order. Also, concurrently with the above steps for the two or more reactors, desorbed refrigerant gas is transferred from a reactor to a condensor, the condensed refrigerant is expanded to a lower temperature and pressure, the cooled refrigerant liquid is evaporated in an evaporator, and the evaporated refrigerant is transferred to a second reactor for absorption. The preferred method of the invention includes preparing two other absorption reactors for the same absorption and desorption steps by transferring heat between the two reactors, and heating one and cooling the other of these two reactors at constant volume thereby pressurizing one and depressurizing the other reactor. Therefore, with at least four or more reactors the desorption, cooling, heating and absorption steps are carried out with each reactor but at different times in a staggered or out-of-phase sequence that is cyclically repeated.

When the system is used to provide a heat sink for cooling and/or refrigeration, the primary cooling effect is generated by evaporation of refrigerant liquid in the evaporator. When the system is used to provide a heat source in the heat pump mode, the heating effect is generated in both the condenser and one of the reactors which is absorbing refrigerant gas.

DETAILED DESCRIPTION OF PREFERRED EMBODIMENTS OF THE INVENTION

Figure 1:
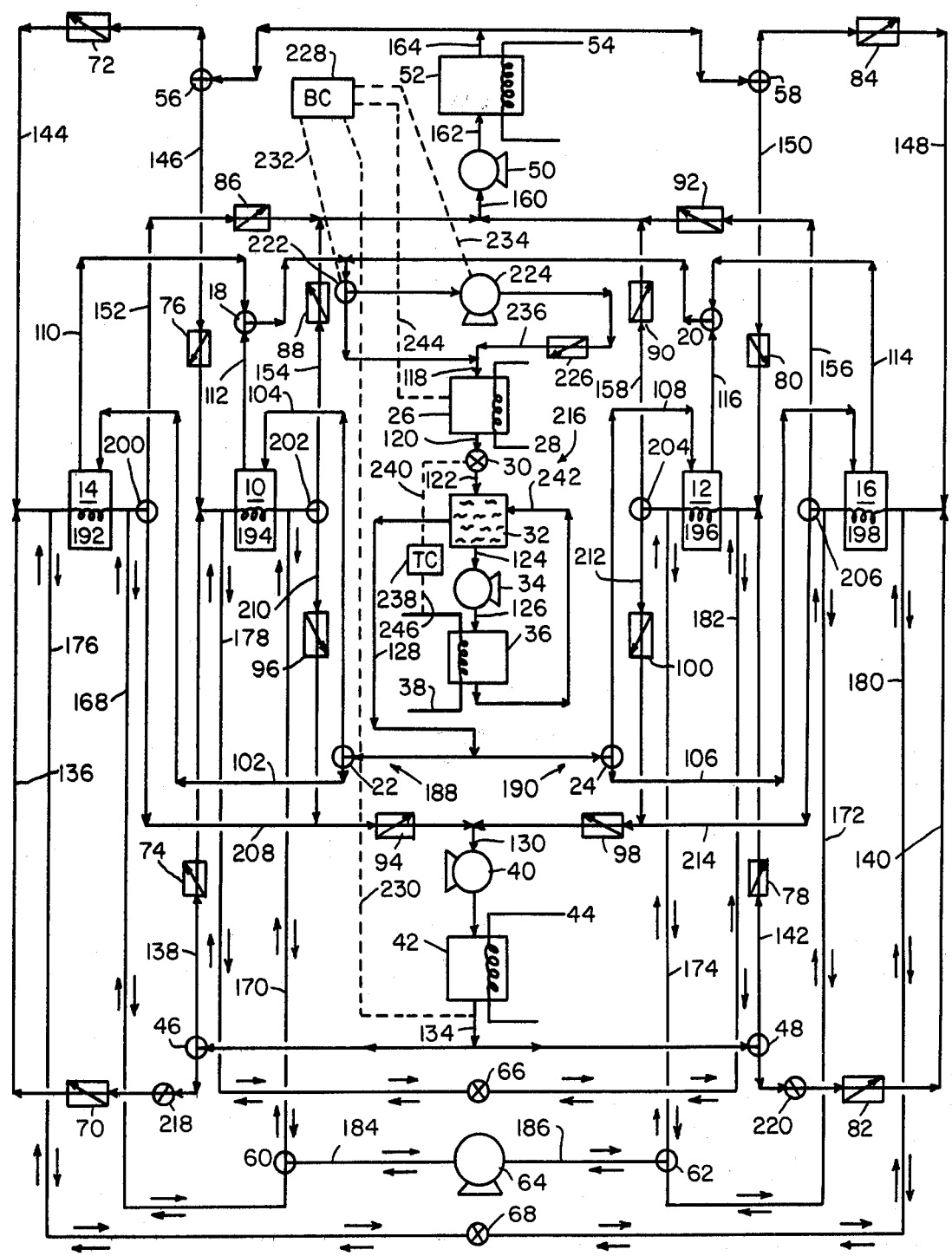
FIG. 1 illustrates in schematic form an absorption system constructed in accordance with one embodiment of the present invention.

In FIG. 1 are shown two reactor absorption systems 188 and 190 each containing one or more different types of absorption materials. Reactors 10 and 14 are in system 188 and reactors 12 and 16 are in system 190. The combined systems can be operated to provide cooling and/or refrigeration or heating using heat exchangers 26, 36, 42 and 52.

The reactor systems 188 and 190 serve the same role as a mechanical compressor in a conventional air conditioning system. During desorption of refrigerant from the absorbents contained in the reactor systems 188 and 190, refrigerant gas is chemically compressed for delivery to heating and cooling system 216. Heating and cooling system 216 contains the same components as a conventional air conditioning system; expansion valve 30 (and expansion tank 32), evaporator 36 (and load pump 34), and condensor 26. In the cooling mode of system 216, evaporator 36 provides the cooling effect. During the heating mode of 216, evaporator 36 absorbs heat from a low temperature secondary heat source, thus providing a heat pump effect.

Refrigerant that has been decompressed by passing through expansion valve 30 is evaporated in evaporator 36 and delivered for absorption as refrigerant gas by the absorbents in reactor systems 188 and 190.

The heat required to effect desorption and compression of refrigerant from the absorbents within reactor systems 188 and 190 is provided by circulation of hot heat transfer fluid between heat source exchanger 42 and each of the reactors 10, 12, 14 and 16 that have absorbents ready for desorption using pump 40. The cooling needed when refrigerant is being absorbed by absorbents within reactor systems 188 and 190 is provided by circulation of heat transfer coolant between cooler 52 and each of the reactors 10, 12, 14 and 16 that have absorbents ready for absorption using pump 50. If a slurry absorbent is used, the above heating and cooling can be provided by circulating the slurry directly between the reactors 10, 12, 14 and 16 and the heat source exchanger 42 and cooler 52 for heating and cooling, respectively.

When cooling of heat transfer fluid in coil 38 is provided by evaporation of refrigerant from conduit 126 in evaporator 36, heat is supplied to heat transfer fluid in conduit 132 through heat exchanger coil 44 in heat source exchanger 42 and heat is removed from heat transfer fluid in conduit 162 through heat exchange coil 54 in cooler 52. Also, refrigerant gas delivered by conduit 118 is condensed in condenser 26 by transferring heat from the refrigerant gas to heat transfer fluid in condenser coil 28 and refrigerant delivered by conduit 126 is evaporated in evaporator 36 by transferring heat to the refrigerant from heat transfer fluid in evaporator coil 38. Condenser 26 could also be air cooled without use of condenser coil 28 and evaporator 36 could also be heated using hot air driven by a blower in place of evaporator coil 38.

Heat transfer fluid in conduit 164 is circulated by pump 50 through cooler 52 to provide cooling of reactors 10 and 14 with reactor coils 192 and 194 via delivery conduits 144 and 146 and valves 56, 72 and 76 and via return conduits 152 and 154 and valves 86, 88, 200 and 202. Heat transfer fluid in conduits 164 is also circulated through reactors 12 and 16 with reactor coils 196 and 198 via delivery conduits 148 and 150 and valves 58, 80 and 84 and via return conduits 156 and 158 and valves 90, 92, 204 and 206.

Heat transfer fluid in conduit 130 is circulated by pump 40 through heat source exchanger 42 to provide heat to reactors 10 and 14 with reactor coils 192 and 194 via delivery conduits 136 and 138 and valves 46, 70 and 74 and via return conduits 208 and 210 and valves 94, 96, 200 and 202. Heat transfer fluid in conduit 130 is also circulated through reactors 12 and 16 with reactor coils 196 and 198 via delivery conduits 140 and 142 and valves 48, 78 and 82 and via return conduits 212 and 214 and valves 98, 100, 204 and 206.

Check valve pairs 86 and 94, 88 and 96, 90 and 100, and 92 and 98 are in the conduits connected to the two-way reactor coil valves 200, 202, 204 and 206, respectively, to prevent backflow of heat transfer fluid between the reactor coils for reactors in the same reactor system such as reactors 10 and 14 in reactor system 188. Check valve pairs 70 and 72, 74 and 76, 78 and 80 are in the conduits connected to the two-way cooler valves 56 and 58 and the two-way valves 46 and 48 connected to the heat source exchanger 42. These check valve pairs prevent mixing of heated and cooled heat transfer fluids in the conduits connected to the respective valve pairs.

Pump 64 is used to transfer heat between reactors 10 and 12 by circulation of heat transfer fluid in reactor coils 194 and 196 through conduits 170, 174, 178, 182 and 186 via valves 60, 62 and 66. Pump 64 is also used to transfer heat between reactors 14 and 16 by circulation of heat transfer fluid in reactor coils 192 and 198 through conduits 168, 172, 176, 180, 184 and 186 via valves 60, 62 and 68. Flows through pump 64 and valves 60, 62, 66 and 68 will be reversed when sensible heat is transferred between reactors 10 and 12 and between reactors 14 and 16. The two directions of flow possible through pump 64 and valves 60, 62 66 and 68 are shown on FIG. 1 by pairs of arrows pointing in opposite directions on opposing sides of conduits 168, 170, 172, 174, 176, 178, 180, 182, 184 and 186.

Refrigerant gas is carried to and from the reactors of systems 188 and 190 by conduits 102, 103, 106, and 108 and through valves 22 and 24, and by conduits 110, 112, 114 and 116 and through valves 18 and 20. Both systems are operated so that each reactor of system 188 is in a step (or phase of operation) compatible with the steps of each of the reactors of system 190. One type of operation is for the first steps in the cycle for reactors 10 and 14 to be as follows: refrigerant vapor is being desorbed from absorbent in reactor 10 and transferred to condensor 26 via valve 18 and conduits 112 and 118 while reactor 14 is being heated at constant volume. In system 190 the complementary steps of the reactors are such that absorbent in reactor 12 is absorbing refrigerant vapor delivered from expansion tank 32 in heating and cooling system 216 via valves 24 and conduits 108 and 128 and reactor 16 is being cooled at constant volume. All vapor is carried to and from the reactors of systems 188 and 190 via the heating and cooling system 216 composed of condenser 26, expansion valve 30, expansion tank 32, pump 34 and evaporator 36 by means of lines 118, 120, 122, 124, 126, 128 and 242. At all times at least one reactor from either system 188 or 190 will be desorbing refrigerant vapor for delivery to the condenser 26 of system 216 and at least one reactor from the other of system 188 or 190 will be absorbing refrigerant vapor delivered from expansion tank 32 of system 216. The remaining reactors of the systems 188 and 190 will concurrently be prepared by heating or cooling for subsequent absorption and desorption of refrigerant via system 216.

Included in the heating and cooling steps at constant volume for reactors 10, 12, 14 and 16 are preheating and precooling steps. During preheating and precooling sensible heat is transferred between whichever reactor pairs are in heating and cooling steps, such as reactors 10 and 12 and reactors 14 and 16, using a heat transfer fluid circulated by pump 64 through reactor coils 192, 194, 196 and 198 and controlled by valves 60, 62, 66 and 68. Since enough sensible heat is not available to complete heating of the reactors, the remaining heat required is obtained by circulating hot heat transfer fluid with pump 40 from heat source exchanger 42 to the coils of the reactor being heated via valves 46 and 48. At the same time, the cooling of the other of the reactor pairs is being completed by circulation of cooled heat transfer fluid with pump 50 from cooler 52 to the coils of the reactor being cooled via valves 56 and 58. During heating and cooling at constant volume, valves regulating refrigerant gas flow into and out of the reactors are positioned to permit no flow. These valves are valves 18 and 22 for the reactors in reactor system 188 and valves 20 and 24 for reactors in system 190.

After completion of these operational steps for reactors in systems 188 and 190, the sequence of steps of each reactor will be repeated. Table I presents the operating sequence of these steps for the reactors in each system.

TABLE I

| Reactor | Step 1 | Step 2 | Step 3 | Step 4 |
|---|---|---|---|---|
| 10 | Desorbing | Cooling | Absorbing | Heating |
| 14 | Heating | Desorbing | Cooling | Absorbing |
| 12 | Absorbing | Heating | Desorbing | Cooling |
| 16 | Cooling | Absorbing | Heating | Desorbing |

If slurry absorbents are used instead of solid, rigid absorbents, the slurry absorbents can be circulated between the reactors 10, 12, 14 and 16 and cooler 52 with pump 50 for absorption and cooling steps via the conduits connected to the reactors at the location of the reactor coils 192, 194, 196, and 198. During desorption and heating steps slurry can be circulated between the reactors 10, 12, 14 and 16 and heat source exchanger 42 with pump 40 via the conduits connected to the reactors at the location of the reactor coils 192, 194, 196, and 198. When slurry absorbents are used, reactor coils 192, 194, 196 and 198 may not be needed but connections to and from the reactors 10, 12, 14 and 16 in place of the coils will be required.

If sensible heat is transferred between the reactors in reactor pair 10 and 12 and reactor pair 14 and 16, two arrangements are possible when slurry absorbents are used in all reactors. Both arrangements require a heat exchange coil in at least one of each of the reactor pairs and the coils would be connected to the conduits directly connected to valves 60, 62, 66 and 68. In one arrangement, heat transfer fluid is used for transferring the sensible heat, and heat transfer fluid is circulated between two reactors and through reactor coils in both reactors with pump 64. In another arrangement slurry absorbent is circulated between two reactors with pump 64. However, in this arrangement, only one heat exchange coil in one of the reactor pairs is needed even though the reactors are at different pressures. Slurry absorbent is directly circulated from the bottom of a first reactor with pump 64 through the heat exchange coil of a second reactor and back to the bottom of the first reactor. In such case pump 64 does not have to be reversible.

Other combinations for removing and supplying heat to the reactors 10, 12, 14 and 16 can be provided particularly if solid absorbents are used in one reactor pair such as reactors 10 and 12 and a slurry absorbent is used in another reactor pair, say reactors 14 and 16. Combinations are even possible where a slurry type absorbent is in one of the two reactors in a reactor pair and a solid absorbent is in the other of the two reactor pairs. Valve, conduit and reactor coil arrangements and valve and pump operational sequence can be easily designed to accommodate all the above combinations using the previous examples for guidance and knowledge available to those skilled in the art.

The operation of heating and cooling system 216 is the same as that of a conventional vapor compression system using refrigerants and a mechanical compressor. Refrigerant leaving condensor 26 via stream 120 enters pressure reducing or expansion valve 30. Some liquid refrigerant passing through valve 30 is vaporized due to the pressure drop across valve 30 thereby cooling the refrigerant and increasing the amount of gaseous refrigerant entering expansion tank 32 via conduit 120. Refrigerant in the expansion tank 32 is separated substantially into liquid and gas phases. A surge tank could be interposed in conduit 120 between the expansion valve 30 and the expansion tank 32 to facilitate efficient transfer of the refrigerant. Pump 34 circulates refrigerant to the evaporator 36 from the expansion tank 32 via conduits 124 and 126. Pump 34 may be any of a number of commercially available relatively low pressure fluid circulation pumps. Vapor formed in the evaporator 36 is returned to expansion tank 32 by conduit 242. Refrigerant vapor is transferred from expansion tank 32 by conduit 128 to the reactors 10, 12, 14 or 16 via valves 22 and 24.

If properly sized, the expansion tank 32 can also serve as a storage means for cold refrigerant. There may be times when little or no evaporation of refrigerant in evaporator 36 is occurring, such as when no cooling is required and either flow rate or temperature of heat transfer fluid through evaporator coil 38 is reduced or flow rate or temperature of air blown over evaporator 36 is reduced in the case that the evaporator 36 is heated by forced air circulation rather than by coil 38. During these times, desorption of refrigerant may still be taking place and cold liquid refrigerant will accumulate in expansion tank 32. Of course, when no cooling effect is needed from evaporator 36 the circulating pump 34 can be stopped. The build up of cold refrigerant in the tank 32 is particularly useful for providing a supply of cold refrigerant when cooling in evaporator 36 is required and little or no desorption is taking place to resupply cold liquid refrigerant to expansion tank 32. Little or no desorption would be the result of too low a temperature in heat exchanger 42 which might occur when a solar energy source is used for exchanger 42. Of course, when no cooling is required by evaporator 36, the circulating pump 34 can be stopped.

The level of liquid refrigerant in expansion tank 32 can also be used as a control signal for actuating the absorption system valve and pumps so that the proper sequence of absorption, heating, desorption and cooling steps are maintained for each absorption reactor as the conditions in either the heat source exchanger 42 or the evaporator 36 vary. For example, if the system were to be designed so that expansion tank 32 is to be used also for refrigerant storage, then the change of refrigerant level in tank 32 could be used as a signal to determine whether or not a reactor would be kept in a desorption and/or an absorption step to ensure desorption and/or absorption is completed in the reactor before switching to another step.

An alternate arrangement for heating and cooling systems 216 would include only the condenser 26, expansion valve 30, and evaporator 36 with the outlet of the evaporator 36 being connected directly to conduit 128, conduit 120 connecting the condenser 26 to valve 30, and conduit 122 connecting valve 30 directly to the inlet of evaporator 36. Reactors in an absorbing step would receive refrigerant vapor delivered from evaporator 36 via conduit 128.

A temperature controller 238 monitors the temperature of the heat transfer fluid in evaporator coil 38 with a temperature transducer via signal line 246 and controls the position of expansion valve 30 via control line 240 to ensure that the temperature in the evaporator 36 is always lower than the temperature of the heat transfer fluid in evaporator coil 38. This is especially needed when the operation of the absorption system is changed from a cooling and/or refrigeration mode to a heat pump mode. This temperature controller is optional and not required if the absorption system is to be used only in one mode, either heating or cooling.

Optional equipment can be added to the heating and cooling system 216 to change operational pressures and temperatures, either in condenser 26 or in reactors containing absorbent which is being desorbed of refrigerant. This equipment includes blower 224 and a three-way valve 222 connected between the reactors 10, 12, 14 and 16 and the condenser 26 by way of conduits 118 and 236. The blower 224 and the three-way valve 222 are each connected via respective signal paths 232 and 234 to blower control 228. A temperature transducer is located at the outlet of heat source exchanger 42 and is also connected to the blower control 228 via signal path 230. Either a pressure or a temperature transducer is located in the condenser 26 and is also connected to the blower control via signal path 244. Blower control 228 evaluates signals from the two transducers.

The blower control 228 is constructed to actuate the blower 224 and the valve 222 when the temperature of the refrigerant in the outlet of the heat source exchanger coil 44 falls below the temperature required to maintain desorption at the existing condensor 26 pressure and temperature. Thus, in the event the temperature of the heat transfer fluid in heat source exchanger 44 is not high enough to desorb refrigerant from the one of the four reactors connected to the condenser 26, the blower 224 will be actuated to boost the pressure of the refrigerant gas from the reactor desorption pressure up to the pressure in the condenser 26. There are other schemes commonly known to those skilled in the art for monitoring when conditions do not exist for adequate desorption in the reactor and that require actuation of the blower 224. For example, the temperature or the pressure of only the desorbing reactor or of only the condenser could be used as a signal to actuate the blower 224 depending on absorption materials and reactor and condenser operating temperature and pressure design points. The blower 224 may be any of a number of commercially available single, multiple or variable speed blowers. In the multiple or variable speed form, the operation of the blower may be selectively controlled via blower control 228 to vary the temperature requirement for absorption imposed on either the condenser or the source of heat for the heat source exchanger 42. Thus, for example, the blower 224 may be partially or totally disengaged when the temperature of the heat transfer fluid circulating through the reactor coils 192, 194, 196 and 198 is high enough to cause desorption of refrigerant vapor from absorbents in reactors 10, 12, 14 and 16 but fully engaged if the temperature of the heat transfer fluid is lower. The temperature required for desorption is related to the temperature and pressure of the condenser 26 where the desorbed refrigerant vapor is being condensed. For example, if the temperature of the heat transfer fluid circulated through condenser coil 28 (or the temperature of air for an air cooled condenser) is increased, the condenser 26 pressure and the pressure in the desorbing reactor will increase. Unless the blower 224 is turned on to boost the pressure in the reactor where desorption is occurring, the temperature of the heat transfer fluid circulating through the desorbing reactor coil would have to be increased to maintain desorption of refrigerant in the reactor. An alternate and simpler but less efficient control scheme for assuring desorption would be to delete the signal from the condenser 26 and have the blower control 228 programmed to actuate the blower 224 and three way valve 222 when the temperature of heat transfer fluid circulated through the reactor coils is below a set temperature point or range that is predetermined by condenser 26 design and expected range of condenser operating pressure and temperatures. If desired, a check valve 226 may be interposed in conduit 236 between the blower 224 and conduit 118 to prevent back pressure on the blower 224. A vacuum pump could also be used in place of the blower 224 to achieve the same operational advantage.

In another embodiment (not shown) a blower and a three-way valve could also be connected between the reactors 10, 12, 14 and 16 and the gas phase outlet of expansion tank 32 or of evaporator 36 (if the tank 32 is not used) in a manner similar to the way blower 224 is connected between the reactors and condenser 26. In this embodiment the operational pressure and temperature either in evaporator 36 (or tank 32) or in reactors containing absorbent which is absorbing refrigerant can be changed by operation and control of the blower and three-way valve using temperature and pressure signals from the reactors and evaporator 36 (or tank 32). As an example, the use of a blower for this embodiment could increase the pressure in an absorbing reactor thereby increasing the maximum temperature of the coolant required to cool the absorbent in the reactor.

Each of the reactors 10, 12, 14 and 16 is a closed vessel containing an absorption-desorption material. When solid absorbents are used, each reactor vessel will contain one or more heat exchange coils for transferring heat into and out of the absorbent material; that is, for heating or cooling the absorbent material. For cost savings and greater simplicity one heat exchange coil is preferred, but of course, this requires the use of the same heat transfer fluid for heating and cooling. If a broad range of temperatures is needed for operation in, e.g., refrigeration and heat pump modes, two heat transfer fluids with different physical properties may be required, one for heating and one for cooling. In such case, two heat exchange coils would be used for each reactor vessel and the valve arrangement for the entire system would be similar to but more complicated than shown in FIG. 2. When using two heat transfer fluids an alternate arrangement for each reactor would consist of two concentric cylinders inside a reactor vessel with the inner cylinder filled with one heat exchange fluid, the outer cylinder surface covered by the second heat transfer fluid, and with the space between the two cylinders containing the absorbent. For details of one possible internal design for reactors with one heat exchange coil, reference can be made to the previously mentioned U.S. Pat. Ser. No. 4,205,531 which describes different reactor configurations for intermittent absorption systems using $Na_2S$ as an absorbent. Also, electric heating elements could be installed inside the reactors to replace or back up the reactor heat transfer coils in the event the heat source for the heat source exchanger 42 is lost or provides heat at too low a temperature to support the desorption step and at least part of the heating step for the reactors. A control means could be provided for monitoring the temperature of heat transfer fluid leaving heat source exchanger 42, for actuating the heating elements when the temperature of the heat transfer fluid is too low during heating and desorption steps, and for changing the positions of valves in conduits connected to the reactor coils to stop flow of the heat transfer fluid through the coils during the heating and desorption steps. Of course, the electric heating elements could be totally relied upon as a heat source for the reactors. In such case the reactor coils and associated valving and conduits would still be used for precooling, cooling, absorption and preheating, and valve positions would still need controlling to stop flow through the reactor coils during heating and desorption.

To achieve the mixing, agitation and circulation needed for slurry type and other type absorption materials to be described later, either a mechanical mixing element or stirrer may need installing inside the reactors, or the reactors may be rotating drums equipped with internal lifters. Other equipment and methods for providing the required agitation, mixing and circulation of the reactor absorbents are commonly available.

The reactor vessels should also contain an inlet and outlet for refrigerant gas absorbed and desorbed in the reactor vessels. When slurry type absorbents are used, the reactor vessel may contain no heat exchange coils since the slurry may be circulated into and out of the reactor vessel for all reactor steps of heating, cooling, absorption, and desorption. Of course, in such cases inlet and outlet connections for the slurry absorbent separate from the refrigerant gas inlet and outlet connections must be provided in the reactor vessels. Due to gravity effects, the slurry connections are located near the bottom of the vessels and the gas connections are located near the top of the vessels. For slurry absorbent applications, in addition to the above connections, a heat exchange coil may be provided in the reactor vessels. This coil could be used during preheating and precooling steps when heat transfer fluid or slurry absorbent from another reactor is circulated through the coil to transfer sensible heat between reactors. Of course, the previously described electric heating elements could also be used for back up or permanent heating in reactors containing slurry absorbents.

The absorption-desorption material in the reactors must be capable of absorbing the gas phase of the absorption system refrigerant and chemically binding the refrigerant gas with a thermally reversible reaction. During absorption heat energy is liberated in the material. This heat energy is derived from the chemical absorption reaction and the latent heat associated with the phase change of the refrigerant when bound to the absorbent. The chemical reaction must be thermally reversible so that the absorbent material can be regenerated or desorbed by driving off the chemically bound refrigerant. To maintain absorption the vapor pressure of the refrigerant gas over the reactor absorbent material will be kept lower (by cooling of the absorbent material) than the vapor pressure of the pure refrigerant gas when in equilibrium with its liquid phase. During desorption, the vapor pressure of the refrigerant gas in the reactor absorbent material will be maintained higher (by heating of the absorbent material) than the pure refrigerant equilibrium vapor pressure.

There are in general at least two different types of absorption-desorption materials that meet the above requirements for this invention if suitable modifications are made to the reactor designs. The first type is solid and porous and does not dissolve appreciably during reactor steps and keeps its absorption-desorption properties over a large number of reactor cycles. The second type of absorption material may be partially dissolved in liquid refrigerant during some or all of the reactor steps.

The material used in the earlier system description, sodium sulfide, is an example of the first type. Residual contaminant gases must be reduced, e.g., by a vacuum pump, in this type of material to keep the partial pressure of these gases well below the pressure of the refrigerant at actual working equilibrium temperatures. This assures that the absorption-desorption process can be repeated without being arrested by the contaminant gases. Care also is required to preclude introduction of large amounts of any of the contaminent gases which might be dissolved in the liquid phase of the working fluid. By adjusting the pressure over the absorption-desorption material within a reactor, the temperatures for equilibrium absorption and desorption of the vapor phase of the working fluid can be raised or lowered.

Some of the preferred properties for the first type of absorption material include:
1. Unchanged state of aggregation in absorbed and desorbed conditions for a large number of absorption-desorption cycles. Changes in shape and the extent of dissolution are small.
2. Minimal change in volume during absorption and desorption.
3. Large active surface area maintained at all times during reactor steps.
4. High change in stored or liberated energy state per unit of volume and/or weight during absorption and desorption.

Materials which satisfy the requirements for the first type of absorbents include sodium sulfide, $Na_2S$ and mixtures of sodium sulfide with other chemicals in which the positive ion is selected from the group $H+$, $Li+$, $Na+$ and the negative ion is selected from the group $O=$, $S=$, $Se=$. These mixtures have been found to be good chemical absorbents for water, ammonia, methanol, methyl amide, ethanol and other bipolar gases capable of acting as refrigerants. The sodium sulfide and its mixtures with the above chemicals can be sintered or baked into a porous body that maintains its shape during repeated absorption and desorption. The temperatures needed to generate a given vapor pressure of the above bipolar gases over the sodium sulfide can be varied by changing either the composition of the absorbent mixtures, e.g., by adding $Li_2$, or by changing the gas, e.g., from water to methanol.

Figure 3:
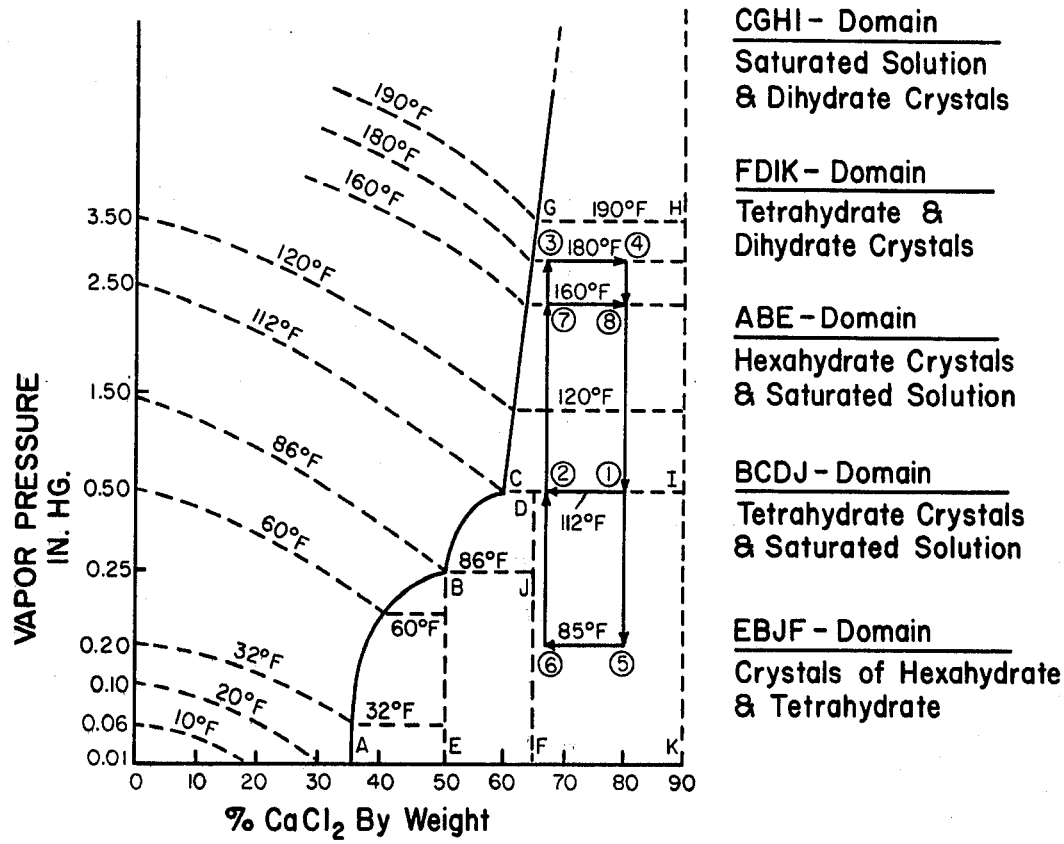
FIG. 3 is a graph illustration of vapor pressure absorbent composition (% calcium chloride) pertinent to absorbent compositions utilized in the absorption system of FIG. 1.

While the second type of absorbent materials may be partially dissolved in refrigerant liquid, it is desirable that they not be completely dissolved. For example, as shown in FIG. 3 for the $CaCl_2$ and water system, the temperature for absorption or desorption can be maintained constant at a constant pressure so long as one or more forms of $CaCl_2$ hydrate crystals do not completely dissolve and are in equilibrium with a solution of $CaCl_2$ dissolved in water. For constant or slightly changed solution compositions, the absorption or desorption temperature will change as the pressure above the solution is changed. However, if the weight percent of water in the system becomes too high, all the $CaCl_2$ hydrate crystals will dissolve and the temperature for desorption and absorption would vary considerably at a constant pressure making the system more difficult to control. Control of the second type of absorbent solution composition within a certain range of water concentration may be needed for constant temperature operation during absorption or desorption in the reactors. This control could include monitoring slurry density, temperature and/or pressure within the reactors.

The second type of absorbent may be a solution containing liquid refrigerant, a first ionic solid compound dissolved in the refrigerant, and one or more other solid compounds in the solution formed by thermally reversible chemical reactions between the first ionic solid compound and the refrigerant. Calcium chloride and sodium sulfate are examples of suitable ionic solids. For the example of FIG. 3, the first ionic solid is a hydroscopic salt, $CaCl_2$ dissolved in a saturated solution of water and solid crystals of the compound $CaCl_2 \cdot 2H_2O$ or dihydrate crystals formed by reaction of water with the first ionic solid, $CaCl_2$. During absorption or desorption within the reactors containing this slurry, the relative amounts of water, dissolved $CaCl_2$ and dihydrate crystals as measured by weight percent vary within a range over which the temperature of the solution remains constant at a constant pressure. To assure uniformity of the solution during desorption and absorption, to reduce localized concentrations of the solution components, and to maintain a high level of contact between the gaseous phase of the working fluid and the slurry, mixing and/or agitation and circulation of solids and liquid inside the reactors is preferred. Use of internal baffles and a mechanical mixer, a rotating drum with lifters, or a fluidized bed are possible methods for providing the desired agitation and circulation.

The second type of absorbent material may not always remain a slurry, particularly if system temperatures are lowered, e.g., during absorption in the heat pump mode of operation. An example of this is again shown in FIG. 3 for the $CaCl_2$ and water system. Below around 112° F., for high enough amounts of $CaCl_2$ relative to water, the slurry solution described above becomes a solid mixture of two calcium chloride compounds, dihydrate and tetrahydrate crystalline compounds. The use of this solid mixture in the reactors requires that the gas phase of the working fluid be brought into intimate contact with the solid crystals. Crystals must be prevented from growing together if they form a non-porous mass, so that intimate contact of the gas phase can be maintained. For this case, the agitation and mixing must be vigorous enough to break crystals apart and prevent the crystals from sticking together or growing too large. Crystal growth modifiers, anticaking agents, and/or chemicals with very low vapor pressures could be added to the slurries to control crystal size and sticking. Sodium sulfate and water also form a series of solutions and crystals similar to calcium chloride and can be used for the absorption-desorption materials in this invention. Other fluids besides water which can exist in the gas phase as bipolar gases can be used with a variety of ionic crystalline solids such as calcium chloride, sodium sulfate, etc., to form similar solutions for absorption and desorption. These fluids include ethanol, methanol, methyl amide, ammonia, etc.

To explain the overall operation of the absorption system, the operation of reactors 10 and 12 will be described at first when the system is providing cooling. Next, the alternating sequence of operation for the other reactors 14 and 16 will be described. By way of illustration, the initial condition of the porous $Na_2S$ absorbent in reactor 12 will be taken as in a desorbed, dehydrated state. That is, a hydrate of $Na_2S$ is not present and the temperature of reactor 12 is between the absorbing temperature of reactor 10 and the temperature of the heat transfer fluid in conduit 164 leaving cooler 52. The initial condition of $Na_2S$ absorbent in reactor 10 will be taken as in an absorbed, hydrated state. That is, a hydrate of $Na_2S$ is present and the temperature of reactor 10 is between the desorbing temperature of reactor 12 and the temperature of the heat transfer fluid in conduit 134 leaving heat source exchanger 42.

During operation of the system in the cooling mode for the example of cooling a building using either outside air or the ground as a heat sink to condense water vapor in condenser 26 and to act as a heat sink for cooler 52, the temperature of water vapor absorption in the reactors containing the $Na_2S$ absorbent would generally be about 55° C. higher than the evaporator 36 temperature. For an evaporator temperature of 5° C the absorption temperature would be about 60° C. Similarly the temperature of the water vapor desorption in the reactors containing $Na_2S$ absorbent would be about 55° C. higher than the condensing temperature in condenser 26. For a condenser temperature of 35° C. the reactor desorption temperature would be about 90° C. Temperature differentials other than 55° C. between the absorbent and the evaporator 36 in the absorption step and between the absorbent and the condenser 26 in the desorption step can be achieved by using absorbents other than pure $Na_2S$ and/or by using refrigerants other than water such as ammonia or methanol. Some of these absorption materials may require sufficient agitation to maintain efficient absorption and desorption of refrigerant gas within the reactors. Consider the $CaCl_2$ absorbent example of FIG. 3 where the temperature differential when the absorption system is operated in the cooling mode about 30° C. for the absorption step and about 40° F. for the desorption step. Other refrigerants and absorbents that can be used have been described above.

Water vapor generated by evaporation of liquid water in evaporator 36 with the heat transferred from a cooling load using evaporator coil 44 is conducted via conduits 108 and 128 and valve 24 to reactor 12 where it combines chemically with the $Na_2S$ absorbent therein in an exothermic reaction. This chemical reaction produces enough heat so that the temperature in reactor 12 absorbent must be controlled by the circulation of coolant heat exchange fluid from cooler 52 through coil 196 in reactor 12. The temperature and/or circulation rate of the coolant are controlled to keep the pressure over the absorbing $Na_2S$ from exceeding the pressure in the expansion tank 32.

The liquid water provided to evaporator 36 from expansion tank 32 is supplied by means of the desorption of water vapor from the $Na_2S$ hydrate in reactor 10 and the subsequent condensation of this water vapor to liquid in condenser 26 and depressurization across expansion valve 30. Desorbed water vapor from reactor 10 is transferred to condenser 26 via valve 18 and conduits 112 and 118.

The pressure and temperature of the liquid water is reduced in valve 30 to the pressure and about the temperature in expansion tank 32. Some water is vaporized in valve 30, is passed to expansion tank 32 and must ultimately be absorbed in reactor 12.

Water vapor is desorbed from the hydrated $Na_2S$ absorbent in reactor 10 using heat energy supplied by circulation of hot heat exchange fluid through coil 194 in reactor 10. This desorption reaction is the reverse of the absorption reaction in reactor 12, is endothermic, and therefore must be regulated by controlling the temperature and/or circulation rate of hot heat transfer fluid from the heat source exchanger 42 to keep the pressure over the desorbing hydrate in reactor 10 from falling below the pressure in condenser 26.

When the $Na_2S$ absorbent in reactor 10 has been substantially desorbed of water the valving for conduits connected to reactors 10 and 12 is changed so that up to 50% of the sensible heating effect of reactor 10 may be recovered to increase the temperature of reactor 12. Recovery of the sensible heat increases the overall efficiency of the absorption system. The heat exchange fluid must be the same in conduits 170 and 178 as in conduits 174 and 182 since the heat exchange coils of reactors 10 and 12 are connected by these conduits when sensible heat recovery is desired. Heat removed from reactor 10 and transferred to the heat exchange fluid in coil 194 is supplied to reactor 12 via conduits 170, 174, 178 and 182 and valves 60, 62, 66, and 68 and coil 196 in reactor 12. After passing through coil 196 the heat exchange fluid returns to pump 64 through conduits 174 and 186 and valve 62. Pump 64 pumps the heat exchange fluid to reactor 10 via conduits 170 and 184 and valve 60. As a result, the temperature of the desorbed $Na_2S$ absorbent in reactor 10 is lowered. In these steps reactor 10 has been precooled and reactor 12 has been preheated at constant volume.

Since reactor 12 cannot be completely heated up to the required desorption temperature by the sensible heat in reactor 10, additional heat energy must be transferred to reactor 12 by circulating hot coolant from heat source exchanger 42 through heat exchange coil 196 in reactor 12. This is the heating step for reactor 12 shown in TABLE I. Valve 62 is now positioned to stop the flow between reactor 10 and 23 via conduit 66 that was established during the earlier preheating step. Valve 48 is turned to permit flow of hot heat exchange fluid from heat source exchanger 42 via conduit 134 through conduit 142 to coil 196. Flow from coil 196 is carried back to heat source pump 40 by conduit 212 via conduit 130. Valve 202 is also positioned to permit flow from coil 196 to conduit 212. Valves 20 and 24 are turned so that no vapor flows into or out of reactor 12 during the preheating and heating steps.

Concurrent with the heating of reactor 12, reactor 10 must be further cooled since not enough sensible heat was removed from reactor 10 during the precooling step to lower the temperature of reactor 10 absorbent to the temperature required for subsequent absorption of water vapor from evaporator 36. Valve 60 is positioned to stop flow into reactor 10 via conduit 184. Valve 56 is adjusted so that flow of coolant from cooler 52 is established through coil 194 in reactor 10 via conduit 146. Coolant from coil 194 is returned to cooler pump 50 via valve 202 and conduits 154 and 160. Valves 18 and 22 are moved so as to ensure no vapor flows into or out of reactor 10 during the precooling and cooling steps.

The next step in the cycle is the desorption of water vapor from reactor 12 absorbent to condenser 26 via conduits 116 and 118 and valve 20. Concurrently, there is absorption of water vapor in reactor 10 from expansion tank 32 via conduit 128 and 104 and valve 22. Valve 24 is moved to stop flow of vapor into reactor 12 through conduit 108 while valve 18 is moved to stop flow of vapor out of reactor 10 through conduit 112. Water vapor in reactor 12 is desorbed by means of heat energy transferred to heat exchange coil 196 from hot heat transfer fluid circulated with heat source pump 40. Valves 48 and 204 are adjusted to permit flow of the hot heat transfer fluid from heat source exchanger 42 via conduits 142 and 212. When water vapor is absorbed by reactor 10, the temperature in reactor 10 is maintained almost constant by circulation of coolant through coil 194. The position of valve 56 remains unchanged from the previous cooling step so that coolant from cooler 52 continues through coil 194 via conduit 146 and is returned to cooler pump 50 via valve 202 and conduits 154 and 160.

The final steps of the cycle are for the precooling and cooling of reactor 12 and the preheating and heating of reactor 10. The preheating and precooling is accomplished by transferring sensible heat from reactor 12 to reactor 10 using circulating pump 64. The direction of flow of heat exchange fluid between reactors 10 and 12 need not be reversed during this step compared to the earlier heating and cooler steps. Therefore, pump 64 does not need to be a reversible pump whose direction of rotation would be reversed during this step. If a reversing pump were to be used alternate conduit and valve arrangements can readily be constructed to achieve the same result.

Figure 2B:
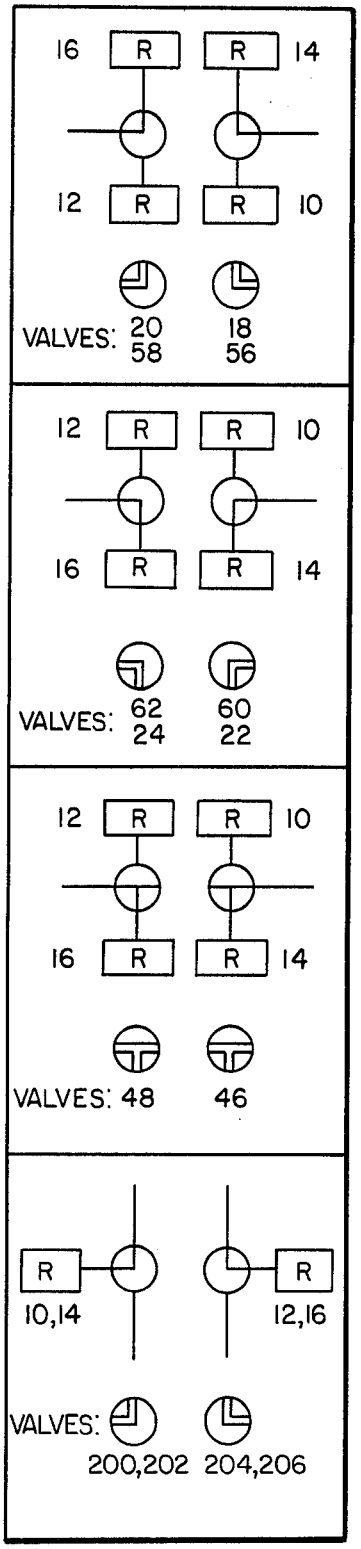
FIG. 2 is a valve orientation table of valves shown in FIG. 1.
Figure 2A:
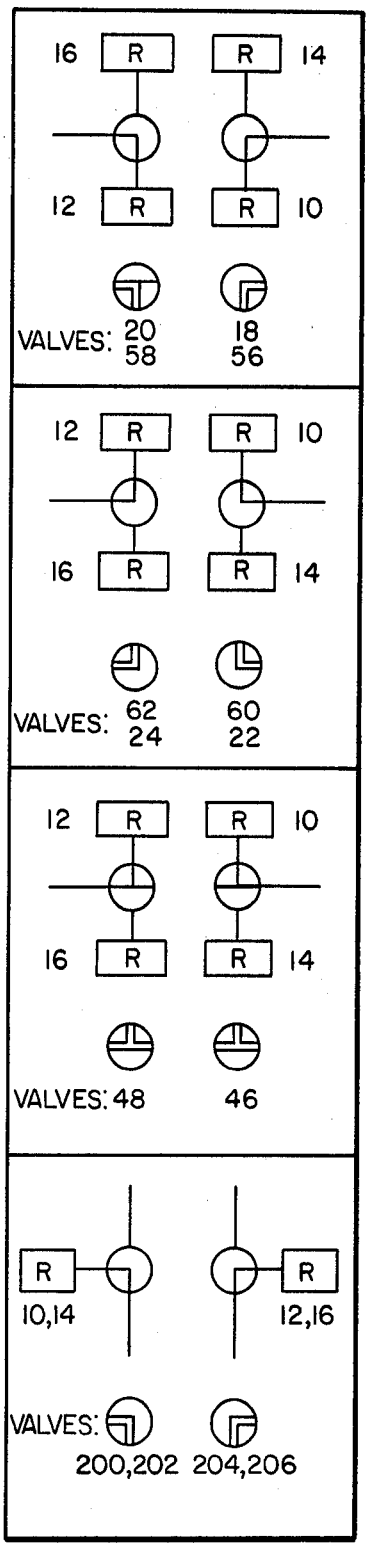
Figure 2C:
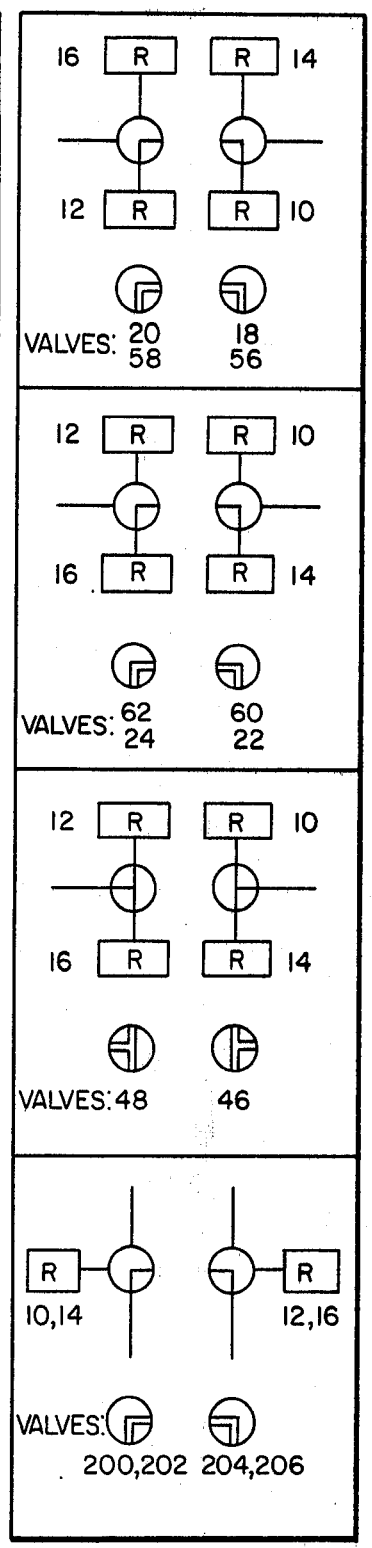

The described four steps of reactor 10 and the four steps of reactor 12 constitute a complete cycle for the cooling/refrigeration mode of operation and are representative of the sequential steps required for reactors 14 and 16 in the cooling mode A continuous heat sink is made available in evaporator 36 by the proper synchronization of the four reactors. The sequential steps for each reactor in one complete cycle has been previously explained using TABLE I. To better document and describe the synchronization and sequential operation of the valves during the cooling mode of operation, Table II and FIG. 2 are presented for showing the positions of the valves used in controlling the flows of heat exchange fluids and the flow of vapor between reactors.

TABLE II

| Valve Position | Reactor 10 | Reactor 14 | Reactor 12 | Reactor 16 |
|---|---|---|---|---|
| Desorbing | | | | |
| A | 18,202 | 60,200 | 20,204 | 62,206 |
| B | 60 | 18,46 | 62 | 20,48 |
| C | 22,46,56 | 22,56 | 24,48,58 | 24,58 |
| Open/Shut | 68/66 | 66/68 | 68/66 | 66/68 |
| | 218/220 | 218,220/— | 220/218 | 218,220/— |
| Precooling | | | | |
| A | 60 | 22 | 62 | 24 |
| B | 18,46 | 46,60 | 20,48 | 48,62 |
| C | 22,56,202 | 18,56,200 | 24,58,204 | 20,58,206 |
| Open/Shut | 66/68 | 68/66 | 66/68 | 68/66 |
| | 218,220/— | 220/218 | 281,200/— | 218/220 |
| Cooling | | | | |
| A | 56 | 22 | 58 | 24 |
| B | 18,46,202 | 46,56,200 | 20,48,204 | 48,58,206 |
| C | 22,60 | 18,60 | 24,62 | 20,62 |
| Open/Shut | 66/68 | 68/66 | 66/68 | 68/66 |
| | 218/220 | 220/218 | 220/218 | 218/220 |
| Absorbing | | | | |
| A | 22,56 | 46,60 | 24,58, | 48,62 |
| B | 46,60 | 22,56 | 48,62 | 24,58 |
| C | 18,202 | 18,200 | 20,204 | 20,206 |
| Open/Shut | 68/66 | 66/68 | 68/66 | 66/68 |
| | 220/218 | 218/220/— | 218/220 | 218,220/— |
| Preheating | | | | |
| A | 60 | 18,46 | 62 | 20,48 |
| B | 22,46,56 | 60 | 24,48,58 | 62 |
| C | 18,202 | 22,56,200 | 20,204 | 24,58,206 |
| Open/Shut | 66/68 | 68/66 | 66/68 | 68/66 |
| | 220/218 | —/218,220 | 218/220 | —/218,220 |
| Heating | | | | |
| A | 46,202 | 18,200 | 48,204 | 20,206 |
| B | 22,56 | 60 | 24,58 | 62 |
| C | 18,60 | 22,46,56 | 20,62 | 24,48,58 |
| Open/Shut | 66/68 | 68/66 | 66/68 | 68/66 |
| | 220/218 | 218/220 | 218/220 | 220/218 |

The same steps in Table I and the valve positions shown in Table II are used for operation of the absorption system as a heat pump. As an example using Na₂S absorbent, heat is extracted at temperatures below 55° F. in the evaporator 36 from heat transfer fluid circulated through evaporator coil 38 and in communication with a low temperature heat source such as air outside a building or the ground. Heat is rejected in condenser 26 to heat transfer fluid passing through condenser coil 28 at temperatures greater than about 65° F. This rejected heat can be used to provide the heat load for heating air inside a building. Water evaporated in evaporator 36 will always be absorbed in one of the four reactors at a temperature usually above about 65° F. The heat energy released during this absorption will be transferred to the reactor cooler 52 with transfer fluid circulated through the one of the reactor coils for the reactor in which absorption is taking place. Heat energy can thus be recovered from reactor cooler 52 using cooler coil 54 during the heat pump mode of operation.

The liquid refrigerant entering the expansion tank 32 or evaporator 36 must be maintained at a temperature below the temperature of fluid circulated through evaporator coil 38. When the same absorption system is switched from a cooling to a heating mode, heat transfer fluid circulated through the evaporator coil 38 no longer absorbs heat from a cooling load but will absorb heat from an alternate heat source such as air outside a building or the ground. When the temperature of this alternate heat source is lower than the cooling load temperature, the refrigerant temperature in the evaporator 36 must be lowered to below the temperature of the fluid in the evaporator coil 38 to ensure heat is still transferred from the heat source to the liquid refrigerant in the evaporator 36. The pressure and temperature of the refrigerant in the evaporator 36 can be lowered and controlled by adjusting the pressure reducing or expansion valve 30. The expansion valve 30 is operatively controlled by a temperature control 238 via control path 240. Control 238 is connected to a temperature transducer in the evaporator coil 38 via signal path 246. The temperature control is programmed by conventional techniques to ensure the temperature in the expansion tank 32 or evaporator 36 is maintained below the temperature of the heat transfer fluid from the alternate heat source (outside air, ground, etc.) that passes through evaporator coil 38. The temperature transducer could also be located in the alternate heat source such as the ground or outside air.

During operation of the absorption system in the heat pump mode for the example of heating a building with extraction of heat from outside air, the temperature of water vapor absorption in the reactors containing the Na₂S absorbent would generally be about 55° C. Similarly, the temperature of water vapor desorption in the reactors containing Na₂S absorbent would generally be about 55° C. higher than the temperature of refrigerant in the condensor 26. For a condenser temperature of 35° C., the reactor desorption temperature would be about 90° C. Temperature differentials other than 55° C. between the absorbent and evaporator 36 during absorption and between the absorbent and condenser 26 during desorption can be achieved by using absorption materials other than Na₂S and/or by using refrigerants other than water such as methanol. Some of these other absorption materials will require sufficient agitation for efficient absorption and desorption of refrigerant gas. Consider the CaCl₂ absorbent example of FIG. 3 where the temperature differential for operation of the absorption system in the heating mode is about 30° C. for both the absorption and desorption steps. A discussion of other refrigerants and absorbent materials has been presented earlier in the description of this invention.

In the heat pump mode of operation, the amount of heat energy extracted from the outside air that is recovered during absorption in the reactors and used for the heat load (say, heating the inside of a building) can equal the amount of heat energy that must be delivered to the reactors for desorption. Most of the desorption heat energy is recovered in the condenser 26 via condensor coil 28 and can be used to provide heating by circulation of heat transfer fluid through coil 28. This same heat energy can also be recovered by blowing air over condenser 26 if it is air cooled. Hence, about twice as much energy can be delivered by this system for heating purposes as is requried to drive the desorption in the reactors. As noted earlier, heat loads can be supplied during the heat pump mode from two locations in the system at the same time. This is because at all times while one reactor is absorbing and releasing heat energy, another reactor is desorbing and refrigerant is being condensed thereby releasing heat energy in the condenser 26. Hence, the two heat transfer fluids circulated through condenser coil 28 and through reactor cooler coil 54 will usually both be at temperatures in the heating mode to supply heat for heat loads.

What is claimed is:

1. An absorption system comprising:
   a first absorption-desorption subsystem including first reactor means;

a second absorption-desorption subsystem including second reactor means;

a first absorbent material in said first reactor means for chemically absorbing gaseous refrigerant;

a second absorbent material in said second reactor means for chemically absorbing gaseous refrigerant;

condenser means for condensing at least some of said gaseous refrigerant into liquid refrigerant;

a first transfer means for periodically transferring said refrigerant gas to said condenser means from a selected one of said first and second reactor means in response to desorption of said refrigerant gas;

expansion means connected for receiving refrigerant from said condenser means and for expanding said refrigerant to reduce the temperature and pressure of said refrigerant;

evaporation means connected for receiving refrigerant from said expansion means and for evaporating at least some liquid refrigerant received thereby;

a second transfer means for periodically transferring refrigerant gas from said evaporation means to a selected one of said first and second reactor means in response to absorption of said refrigerant gas;

means for supplying heat to said first and second reactor means in alternating sequence for effecting chemical compression of said first and second absorbent materials and for effecting desorption of refrigerant gas from said first and second absorbent materials; and means for removing heat from said first and second reactor means in alternating sequence for effecting chemical decompression of said first and second absorbent materials and for effecting absorption of refrigerant gas in said first and second absorbent materials.

2. The absorption system of claim 1 which further comprises means for reducing the partial pressure of gases other than said refrigerant gas in the said absorption system below the vapor pressure of said refrigerant gas.

3. The absorption system of claim 2 wherein said means for reducing the partial pressure of said gases other than said refrigerant gas below the vapor pressure of said refrigerant gas comprises a vacuum pump and conduit and valving means such that said vacuum pump is connected by the said valving and conduit means to said first and second reactor means for evacuating said gases other than said refrigerant gas from said first and second reactor means.

4. The absorption system of claim 1 wherein said means for supplying heat and said means for removing heat includes means for transferring sensible heat between said first and second reactor means.

5. The absorption system of claim 1 wherein said expansion means comprises an expansion tank for containing refrigerant.

6. The absorption system of claim 1 wherein said expansion means comprises:
an expansion tank for containing refrigerant; and
an expansion valve through which refrigerant from said condenser means is expanded to said expansion tank.

7. The absorption system of claim 6 wherein said expansion means further comprises:
means for monitoring level of liquid refrigerant in said expansion tank; and means for controlling said absorption, heating, desorption and cooling steps of said first and second reactor means responsive to the level of said liquid refrigerant transmitted by said level monitoring means.

8. The absorption system of claim 1 wherein said evaporation means comprises:
a heat exchange fluid;
heat exchange means connected in a heat transfer relationship with a heat source;
conduit means connected for conducting refrigerant from said expansion means to said heat exchange means and from said heat exchange means to a selected one of said first and second reactor means in which fluid from said evaporation means is absorbed; and
pump means connected to said conduit means for circulating refrigerant through said conduit means, said heat exchange means and said reactor means.

9. The absorption system of claim 1 wherein at least one of said first and second absorbent materials consists essentially of sodium sulfide disposed in a rigid, chemically absorbent and porous formation.

10. The absorption system of claim 1 wherein at least one of said first and second absorbent materials consists of sodium sulfide mixed with a second chemical in which the positive ion is selected from the group consisting of $H+$, $Li+$, and $Na+$ ions and the negative ion is selected from the group consisting of $O=$, $S=$, and $Se=$ ions, such that said sodium sulfide and said second chemical are disposed in a rigid, chemically absorbent and porous formation.

11. The absorption system of claim 1 wherein at least one of said first and second absorbent materials consists of at least one compound formed by thermally reversible chemical reaction between an ionic solid and a refrigerant.

12. The absorption system of claim 11 wherein said ionic solid is selected from the group consisting of calcium chloride and sodium sulfate.

13. The absorption system of claim 1 wherein said refrigerant gas is selected from the group consisting of water, ammonia, methanol, ethanol, methyl amide, and mixtures thereof.

14. The absorption system of claim 1 wherein said means for suppling heat to at least one of said first and second reactor means comprising:
a heat exchange means;
conduit and valve means connected for conducting a heat exchange fluid between said heat exchange means and at least one of said first and second reactor means; and
pump means connected to said conduit and valve means for circulating said heat exchange fluid in said conduit and valve means and in said heat exchange means.

15. The absorption system of claim 1 wherein said means for removing heat from at least one of said first and second reactor means comprises:
a heat exchange means;
conduit and valve means connected for conducting a a heat exchange fluid between said heat exchange means and at least one of said first and second reactor means; and
pump means connected to said conduit and valve means for circulating said heat exchange fluid in said conduit and valve means and in said heat exchange means.

16. The absorption system of claim 1 wherein at least one of said first and second absorbent materials consists of an absorbent slurry containing an ionic solid, part of which ionic solid is at least partially dissolved in refrigerant liquid and the remaining part of which ionic solid is combined with at least some refrigerant via thermally reversible chemical reaction.

17. The absorption system of claim 16 wherein said ionic solid is selected from the group consisting of calcium chloride and sodium sulfate.

18. The absorption system of claim 16 wherein said means for supplying heat to any of said first and second reactor means containing said absorbent slurry comprises a pump means and a conduit and a valve system connected to a heat source and to any of said first and second reactor means containing said absorbent slurry such that at least the liquid and solid contents of any of said first and second reactor means containing said absorbent slurry is circulated by said pump means between said heat source and any of said first and second reactor means containing said absorbent slurry through said conduit and valve system.

19. The absorption system of claim 16 wherein said means for removing heat from any of said first and second reactor means containing said absorbent slurry comprises a pump means and a conduit and a valve system connected to a heat sink and to any of said first and second reactor means containing said absorbent slurry such that at least the liquid and solid contents of any of said first and second reactor means containing said absorbent slurry is circulated with said pump means between said heat sink and any of said first and second reactor means containing said absorbent slurry through said conduit and valve means.

20. The absorption system of claim 16 wherein said means for supplying heat to effect said chemical compression and said desorption in any of said first and second reactor means containing the said slurry absorbent comprises:
   a heat exchange means;
   conduit and valve means connected for conducting a heat exchange fluid between said heat exchange means and any of said first and second reactor means containing said slurry absorbent; and
   pump means connected to said conduit and valve means for circulating said heat exchange fluid in said conduit and valve means and in said heat exchange means.

21. The absorption system of claim 16 wherein said means for removing heat to effect said chemical decompression and said absorption in any of said first and second reactor means containing the said slurry absorbent comprises:
   a heat exchange means;
   conduit and valve means connected for conducting a heat exchange fluid between said heat exchange means and any of said first and second reactor means containing said slurry absorbent; and
   pump means connected to said conduit and valve means for circulating said heat exchange fluid in said conduit and valve means and in said heat exchange means.

22. The absorption system of claim 1 wherein said first transfer means comprises a conduit and valving system connected between said condenser means and said first and second reactor means, and a control means for operating said valving to permit transfer of refrigerant gas from a selected one of said first and second reactor means in which a refrigerant gas is being desorbed.

23. The absorption system of claim 1 wherein said second transfer means comprises a conduit and valving system connected between said evaporation means and said reactor means, and a control means for operating said valving to permit transfer to a selected one of said first and second reactor means in which said refrigerant gas is being absorbed.

24. The absorption system of claim 1 wherein said means for supplying heat energy to at least one of said first and second reactor means comprises electric heating element and a control means to deactuate said electric heating element during removal of heat energy from the one of said first and second reactor means containing said electric heating element and for actuating said electric heating element during supplying heat energy to the one of said first and second reactor means containing said heating element.

25. The absorption system of claim 1 further comprising a blower and valving and conduit means connected for conveying refrigerant to the blower from the selected one of said first and second reactor means containing absorbent material being desorbed and from the blower to the said condenser means.

26. A method for providing heating and cooling from an absorption system which includes two subsystems each containing at least two absorption-desorption reactors which method comprises the steps of:
   desorbing a refrigerant gas from a first absorbing material in a first reactor in said first subsystem at a pressure P, and a temperature T, with the heat to desorb the said refrigerant gas being provided by a primary heat source;
   condensing at least some liquid refrigerant out of said desorbed refrigerant gas wherein cooling for said condensing is provided by a primary heat sink;
   expanding refrigerant fluid from said condensing step to obtain a lower temperature refrigerant fluid at a lower pressure;
   evaporating at least some of said liquid refrigerant after said expanding step;
   absorbing the fluid from said evaporating step in a second absorbing material in a first reactor of said second subsystem at a temperature $T_2$ and a pressure $P_2$ less than P, with the cooling needed to remove heat from said second absorbing material and thereby maintain pressure $P_2$ less than pressure P being provided by a heat sink when operating in a cooling mode and by a heat load when operating in a heating mode;
   terminating said desorbing in said first reactor of said first subsystem and said absorbing in said first reactor of said second subsystem;
   initiating second desorbing steps and second absorbing steps approximately concurrent with said terminating step, said second desorbing steps and said second absorbing steps comprising the steps of:
      desorbing at said pressure P and said temperature T a second absorbing material in a second reactor of said first subsystem; and
      absorbing at said pressure $P_2$ and said temperature $T_2$ in a first absorbing material in a second reactor of said second subsystem;
   heating contents of first reactor in said second subsystem at a constant volume from temperature $T_2$ to a higher temperature $T_3$ sufficient to increase pressure in said first reactor to pressure P;

cooling contents of first reactor in said first subsystem at constant volume from temperature T to a temperature $T_4$ sufficient to decrease pressure in said reactor to pressure $P_2$;

terminating said desorbing in said second reactor of said first subsystem and said absorbing in said second reactor of said second subsystem; and cyclically repeating the foregoing steps.

27. The method of claim 26 wherein said cooling and heating at a constant volume includes transferring sensible heat between said first and second reactors of said first and second subsystems being cooled and heated at constant volume.

28. The method of claim 26 wherein at least one of said first and second absorbing materials consists essentially of sodium sulfide disposed in a rigid, chemically absorbent and porous formation.

29. The method of claim 26 wherein at least one of said first and second absorbing materials consists of sodium sulfide mixed with a second chemical in which the positive ion is selected from the group comprising H+, Li+, and Na+ and the negative ion is selected from the group comprising O=, S=, and Se=, such that said sodium sulfide and said second chemical are disposed in a rigid, chemically absorbent and porous formation.

30. The method of claim 26 wherein said refrigerant gas is selected from the group consisting of water, ammonia, methylamide, methanol, ethanol and mixtures thereof.

31. The method of claim 26 wherein at least one of said first and second absorbing materials is an absorbent slurry containing an ionic solid, part of which ionic solid is at least partially dissolved in refrigerant liquid and the remainder of which ionic solid is combined with at least some refrigerant via thermally reversible reaction.

32. The method of claim 26 wherein said absorbing material in at least one of the said absorption-desorption reactors consists of at least one compound formed by thermally reversible chemical reaction between an ionic solid and a refrigerant.

33. The method of claim 31 wherein said ionic solid is selected from the group consisting of calcium chloride and sodium sulfate.

34. The method of claim 32 wherein said ionic solid is selected from the group consisting of calcium chloride and sodium sulfate.

* * * * *